United States Patent Office

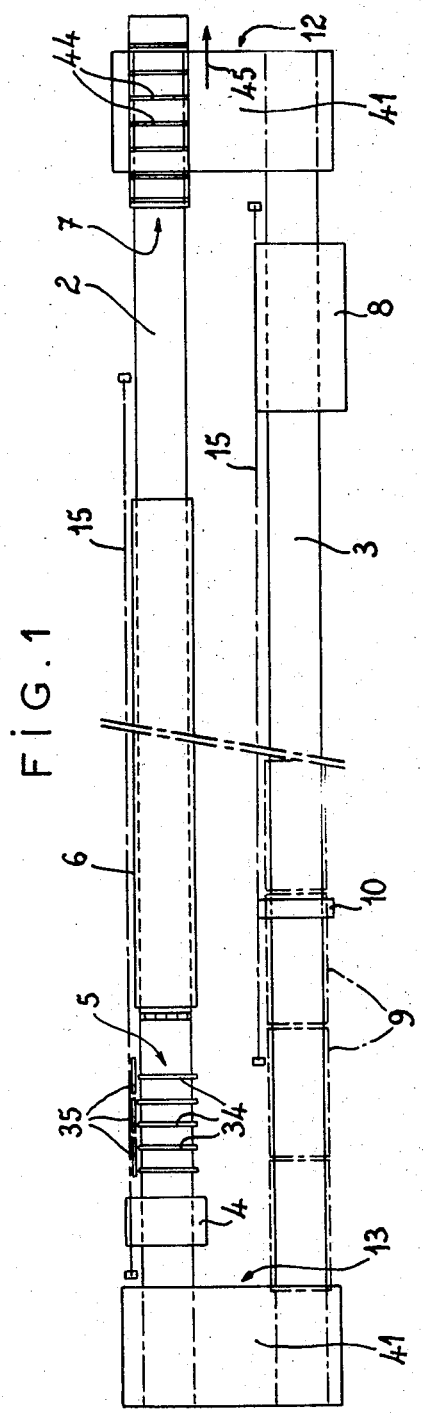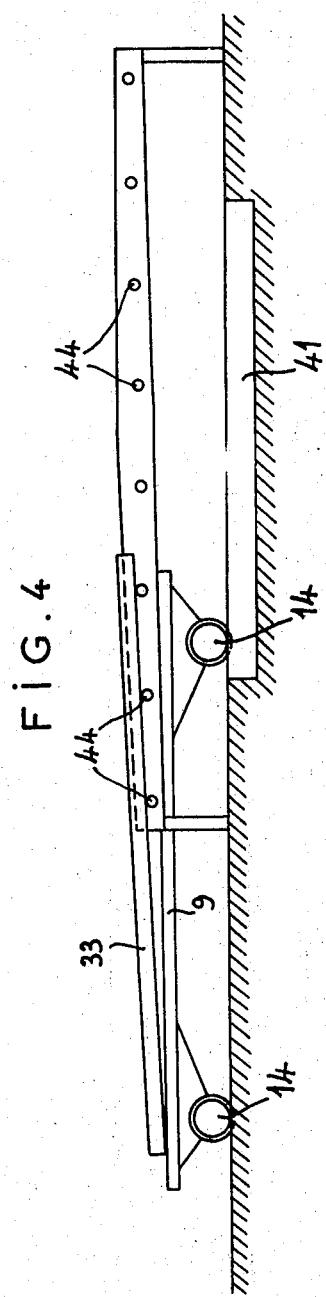

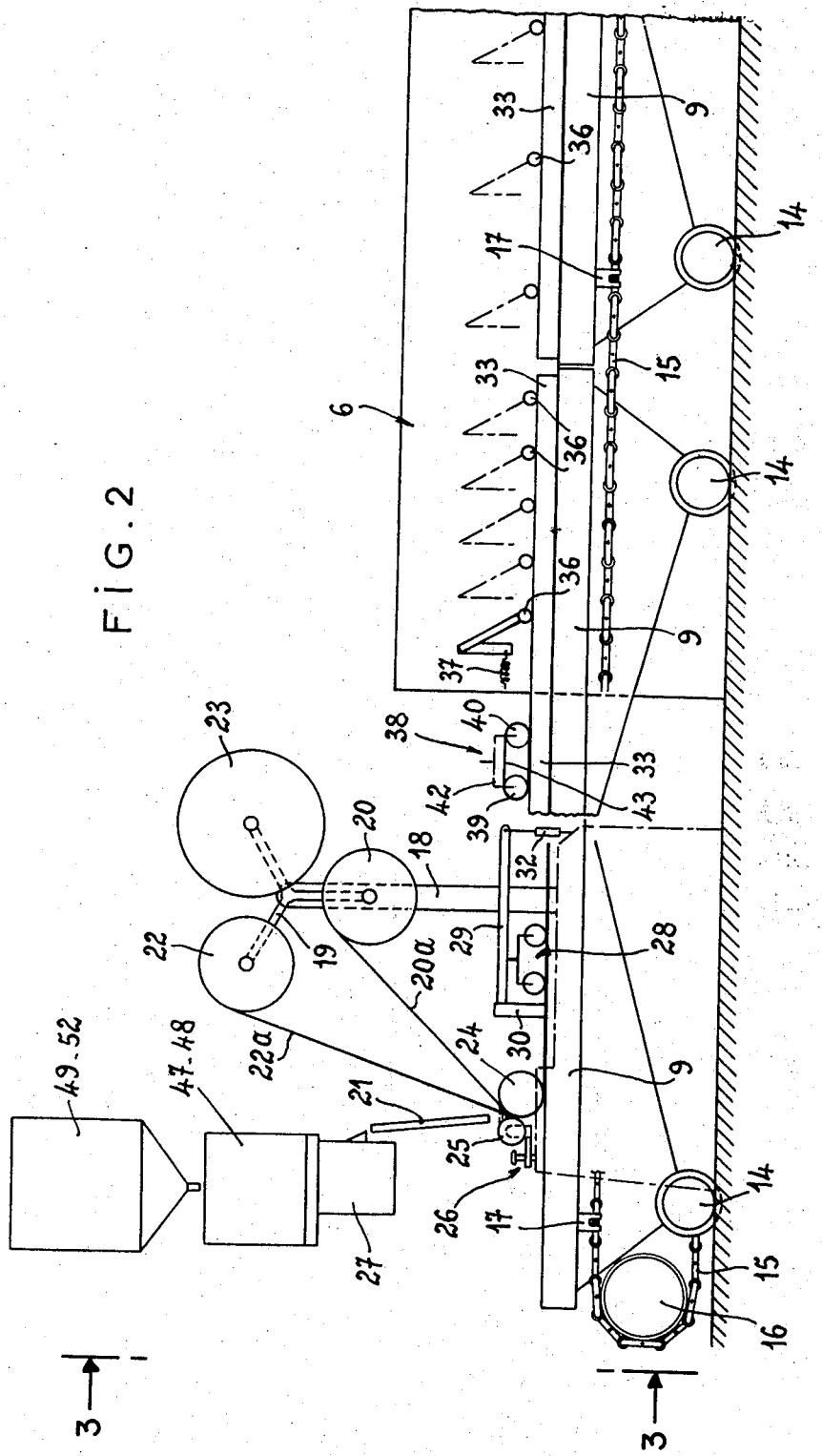

3,834,968
Patented Sept. 10, 1974

3,834,968
INSTALLATION FOR MANUFACTURING STRATIFIED ISOTHERMAL PANELS
Paul Lamberet, Vonnas, Ain, France
Filed Apr. 28, 1972, Ser. No. 248,538
Int. Cl. B32b 31/10
U.S. Cl. 156—389                    8 Claims

ABSTRACT OF THE DISCLOSURE

An installation for manufacturing isothermal panels of stratified material, notably for refrigerator vans, bodies of vehicles and the like, of the type comprising a core of rigid expanded material such as polyurethane sandwiched between two sheets of stratified material such as polyester. The installation comprises a pair of tracks, i.e. an outward track and a return track, along which successive adjacent tables are caused to travel past stations for depositing a resin mixture, a reinforcing textile, web, and an expanded sheet, for curing the resin, and possibly for covering the opposite face of the panel with a resin mixture and a reinforcing textile web.

BACKGROUND OF THE INVENTION

(1) Field of the Invention

The present invention relates to an installation for manufacturing isothermal panels of stratified material.

(2) Description of the Prior Art

In the construction of isothermal cases, notably for refrigerator vans and like vehicles, it is current practice to use panels of stratified materials comprising a core of rigid expanded material such as polyurethane sandwiched between two sheets of stratified material such as polyester.

At present these panels are manufactured by the unit in special molds having dimensions consistent with those contemplated for the panel.

It is obvious that under these conditions the cost of isothermal cases is particularly high, since on the one hand the panel manufacturing process is slow and on the other hand a predetermined series of molds must be provided for each case size.

SUMMARY OF THE INVENTION

It is the essential object of the present invention to avoid these inconveniences. To this end, the arrangement constituting the subject matter of this invention comprises primarily:

(a) a pair of parallel tracks or runways on which tables having dimensions consistent with those of the panels to be manufactured are adapted to travel, each table being mounted to this end on a carriage, and at either end of this track a transfer station permitting the transfer of a table from one track to the other and furthermore, along the first or outward track, (b) a laying station adapted to deliver in succession upon each table and continuously a resin mixture and the textile reinforcement for building up one of the stratified sheets of an isothermal panel, (c) a station for delivering a sheet of expanded material for constituting the isothermal core of the panel, (d) a tubular oven comprising means for pressing the panels on the tables and heating means for accelerating the polymerization of the resin mixture, and (e) a station for stripping the panel finished on at least one face thereof.

Advantageously, means are associated with each track for producing the translation of each table at a constant, adjustable rate, said means being adapted to release the tables upstream of each transfer station.

Preferably, there are also provided, in succession and along the second or return track, a table washing station and a station whereat a gel coat is applied for waterproofing the panel surfaces.

According to a preferred form of embodiment of the present invention, the station for delivering the resin mixture and the textile reinforcing material upon the tables comprises a pair of parallel cylinders disposed horizontally in side by side relationship above the path of said tables with, between said cylinders, a gap adjustable as a function of the desired thickness of the resin mixture and, overlying said gap, at least one suspended spout for pouring the resin mixture from a vessel equipped with stirring means, one of said cylinders further acting as a feed roll for driving the textile sheet constituting the reinforcement of the sheet of stratified material which, under these conditions, is caused to travel between said cylinders so as to become impregnated with the resin mixture before it is laid upon the table travelling at that time past said station.

Advantageously, the stirring vessel is disposed beneath a pair of intermediate vessels located the one under the main resin supply tank and another vessel containing the polymerization accelerator, and the other under a main resin supply tank and another vessel containing the polymerization catalyst, the volumetric capacity of each one of these tanks being selected as a function of the requisite mixture metering characteristics or proportions.

According to a simplified form of embodiment of this invention the station whereat the plates of isothermal material are laid is comprised of an inclined ramp overlying and extending in the same direction as the table path, this ramp consisting of first rolls having horizontal axes and mounted for free rotation, and other auxiliary rolls disposed at right angles to said first rolls but disposed on the ramp side opposite to the return track.

The function of these auxiliary rolls is to facilitate the proper positioning of the plates or sheets on the ramp.

On the other hand, according to an advantageous form of embodiment of this invention, the means for driving the tables along each track or runway comprise on the one hand an endless chain driven at a constant adjustable speed and on the other hand a pawl pivotally mounted to the table concerned and engageable by a link of said endless chain after the table travels from the transfer station to the location of the track concerned from which this table is to be driven automatically. The station whereat the panels finished on at least one face are to be stripped comprises another ramp inclined upwards in the upstream to downstream direction, above the station for transfering the tables from the outwards track to the return track, said ramp consisting of a series of horizontal rolls.

It will be seen that this installation permits of manufacturing isothermal panels of which only the width is limited by the table width, their length depending only on the longitudinal dimension contemplated for the isothermal sheets, since the tables are disposed in edge to edge succession or sequence.

When a panel is completed on one face it is only necessary to bring it back to the station where the isothermal plates or sheets are laid, and to lay a fresh sheet on the unfinished face, as in the case of its first passage.

To obtain a regular resin layer there is provided, downstream of the station for delivering the resin mixture and the textile reinforcements, at least one presser roll and spring means exerting a vertical downward pressure upon its horizontal shaft, the permissible downward stroke of this presser roll being however limited by suitable stops effective notably when no table is present beneath this roller.

A clearer understanding of this invention may be had if reference is made to the attached drawing illustrating diagrammatically by way of example a typical form of embodiment of the invention.

BRIEF DESCRIPTION OF THE DRAWING

FIG. 1 is a very diagrammatic plane view from above showing the installation as a whole;

FIG. 2 is a fragmentary side-elevational view showing on a larger scale the starting section of the "outward" track, the device for forming the stratified sheet and the tubular or tunnel oven;

FIG. 4 is a fragmentary sectional view showing the method of transferring the tables from one track to the other.

DESCRIPTION OF THE PREFERRED EMBODIMENT

Figure 3:
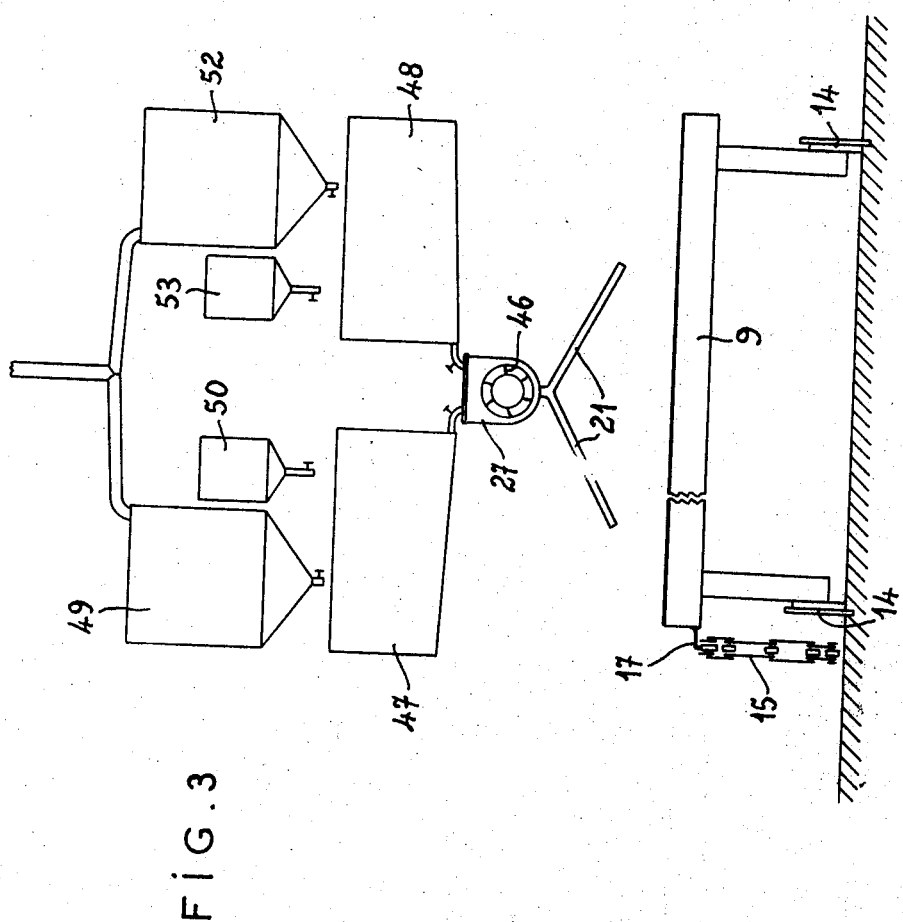
FIG. 3 is an end view showing in section taken along the line 3—3 of FIG. 2 the station for delivering or laying the resin mixture.

FIG. 1 illustrates the installation in general. The installation comprises a pair of parallel "outward" and "return" tracks or runways 2 and 3, respectively, along which a plurality of tables 9 are adapted to travel. The outward track comprises a station 4 whereat the sheet of stratified material is adapted to be laid, a station 5 whereat the insulating panel of expanded material is adapted to be laid, a tubular or tunnel oven 6 and a station 7 for stripping the panel which is at this stage finished on at least one of its main faces.

The return track 3 comprises a station 8 whereat the tables 9 are washed automatically, and a station 10 for depositing a waterproofing gel coat upon the panels.

End devices 12 and 13 are provided for transferring the tables 9 from the end of the outward track 2 to be beginning of the return track 3, and from the end of the return track 3 to the beginning of the outward track 2.

Each table is dimensioned as required for the panel size contemplated and comprises wheels or rollers 14 permitting the translation of the table along the track by being coupled at the beginning of each track with a suitable driving device. This device comprises essentially an endless chain 15 of the link type, driven at a constant speed and disposed horizontally between a pair of sprockets 16, one of which is positively driven from power means (not shown), each table comprising to this end, on its lower face, a driving pawl or lug 17 adapted to be engaged by a chain link. The tables are driven at a constant adjustable speed.

As shown in FIG. 2, the tables 9 travel in edge-to-edge relationship along the tracks 2 and 3.

The station 4 whereat the stratified sheet is laid comprises a vertical post 18 (FIG. 2) supporting at its upper end a three-armed rotating spider 19 having its arms disposed parallel to a vertical plane parallel in turn to the longitudinal axis of said tracks 2 and 3.

The free end of each arm carries a horizontal shaft overlying the track 2 and rotatably supporting a roll 20, 22 and 23, respectively, of textile made from natural or synthetic fibres such as glass fibres.

The third roll 23 is a reserve roll and the other two rolls 20 and 22 deliver the reinforcing material for the stratified sheet. To this end, the fabric webs 20a and 22a delivered from these rolls are caused to travel between a pair of cylinders 24 and 25 having horizontal axes and disposed above the path of tables 9, one cylinder 24 acting as a driving cylinder and the other 25 comprising means 26 for adjusting at will the relative spacing of these cylinders.

Overlying these cylinders 24, 25 is a nearly vertical spout 21 adapted to pour upon the aforesaid cylinders a resin mixture supplied from a vessel 27.

The thus delivered resin mixture is somewhat retained between the cylinders 24 and 25 so that it will impregnate the textile reinforcement as it travels between these cylinders.

The stratified sheet is subsequently laid continuously upon the tables 9 travelling beneath this station and said sheet is then treated by means of so-called "bubble-removing" rolls 28 adapted to regularize the resin layer. These rolls are carried by an arm 29 pivoted at one end to a bracket 30 rigid with the frame structure of the installation and having its opposite end responsive to a pneumatic cylinder-and-piston actuator 32. The latter is adapted to either exert a pressure on the rolls 28 during the operation of the installation or, in contrast thereto, raise said rolls when the installation is inoperative.

The tables 9 covered with the stratified sheet are then caused to pass beneath another station 5 whereat each table receives heat-insulating panel 33 for example of expanded polyurethane. This station 5 comprises a ramp inclined downwardly in the direction of travel of the tables, and disposed above these tables. The ramp comprises rolls 34 (FIG. 1) having horizontal axes and rotating freely, other rolls 35 disposed at right angles to said rolls 34 and disposed laterally on one side only of the ramp for facilitating the proper positioning of the panels.

Preferably, the lateral rolls 35 are disposed on the side of the ramp which is opposite to the return track 3.

Each table having thus received a panel is subsequently directed through the tubular or tunnel oven 6 intended for accelerating the polymerization of the resin mixture. During the passage of the loaded tables through this oven, each panel is compressed more or less against the stratified sheet. This pressure is produced by means of presser rolls 36 responsive to resilient means 37, the height and application pressure of these rolls being adjustable. These presser rolls 36 are disposed at spaced intervals in the oven 6, the gaps between adjacent rolls being however smaller in the first half of the oven length than in the second half.

To facilitate the ingress of the panels into the oven and notably under the aforesaid presser rolls, a pneumatic device 38 comprising a pair of horizontal parallel cylinders 39, 40 disposed across the track 2 just before the oven entrance is provided. These cylinders 39 and 40 are carried by a common structure 42 and one or a plurality of endless belts 43 are passed over these cylinders. One cylinder, namely cylinder 40 in the arrangement illustrated, is the driving cylinder and the assembly is applied with a variable, adjustable pressure upon the panels 33 approaching the oven entrance, thus facilitating their introduction between the presser rolls 36 and the tables 9.

As they emerge from the oven, the panels are directed to a position underlying the stripping station 7. This stripping station comprises a ramp inclined upwards and in the upstream to downstream direction; said ramp is located above the station for transferring the tables from the outward track to the return track, and consists essentially of parallel horizontal rolls 44.

Thus, at the end of the outward track 2, the panel 33 is covered on one face with a stratified sheet. After the stripping operation, this panel 33 can thus be directed either to a storage yard or room as shown by the arrow 45 in FIG. 1, or, if it is desired to cover both faces of this panel, to the beginning of the outward track so that, after being turned upside down, it will receive another covering sheet through the same process.

Under these conditions, the tables 9 released from station 7, i.e. at the end of track 2, are transferred to the return track 3. As shown in FIG. 4, when a table 9 and its panel are delivered to the stripping rolls 44, the panel 33 is directed upon these rolls and the table 9 passes therebeneath.

Thereafter, the table 9 is dropped into a shallow transverse pit 41 interconnecting the tracks 2 and 3. Of course, a similar arrangement is provided for transferring the tables from the return track to the outward track.

During their return travel on track 3, the tables move in succession under the washing station 8 where they are cleaned by removing all impurities likely to subsist after the panel stripping operation, and then under the station 10 whereat a suitable gel coat is sprayed onto said tables. The purpose of this operation is to waterproof the surface of each stratified panel.

According to a specific form of embodiment of this invention, the vessel 27 supplying the resin mixture to the spout 21 comprises stirring means 46 and is disposed beneath a pair of intermediate vessels 47 and 48 filled with accelerated resin and catalyzed resin, respectively. Each vessel 47, 48 is disposed in turn beneath a pair of corresponding tanks 49, 50 and 52, 53, respectively, one of the tanks (49, 52) of each pair constituting the main resin supply, the other tank (50, 53) containing a polymerization accelerator and a polymerization catalyst, respectively.

Of course, the volumetric capacities of these vessels and tanks are calculated as a function of the proportions contemplated for the desired resin mixture.

It will readily appear to those conversant with the art that this invention should not be construed as being strictly limited to the specific forms of embodiment described and illustrated herein, since various modifications and variations may be brought thereto without departing from the basic principles of the invention as set forth in the appended claims.

What I claim as new is:

1. Installation for manufacturing isothermal panels of stratified material, which comprises essentially:
   (a) a pair of parallel outward and return tracks, carriages and tables, said tables having dimensions consistent with those of the panels to be manufactured and being adapted to travel on said tracks, each table being mounted on one of said carriages, and at either end of said tracks a transfer station permitting the transfer of a table from one track to the other,
   (b) a laying station adapted to deliver in succession upon each table and continuously a resin mixture and textile reinforcement for building up one of the stratified sheets of an isothermal panel,
   (c) a station for delivering a sheet of expanded material for constituting an isothermal core of the panel,
   (d) a tubular oven comprising means for pressing the panels on the table and heating means for accelerating the polymerization of the resin mixture,
   (e) a station for stripping the panel finished on at least one face thereof, and
   (f) a station for washing the tables and a station for spraying a gel coat for waterproofing the surface of the panels provided along the return track, in succession.

2. Installation as set forth in claim 1 comprising means associated with each track for causing the translation of said tables at a constant and adjustable rate, said means being adapted to release the tables upstream of each transfer station.

3. Installation as set forth in claim 2, wherein the means provided for driving said tables along each track comprise an endless chain driven at a constant adjustable speed and including connected links, and pawls pivotally connected to the respective tables to engage said links of said chain after being moved from said transfer station to one of the tracks where the table is to the driven automatically.

4. Installation as set forth in claim 1, wherein the station for laying the resin mixture and the textile reinforcement upon each table comprises a pair of parallel cylinders having horizontal axes, disposed in side-by-side relationship above the path followed by said tables and with a gap therebetween, means for adjusting said gap as a function of the desired thickness of the resin mixture, a vessel including stirring means and at least one spout suspended above said cylinders for pouring the resin mixture from said vessel equipped with said stirring means, one of said cylinders constituting a means for driving the textile web constituting the reinforcement of the sheet of stratified material which is thus caused to travel between said pair of cylinders so as to be impregnated with resin before being deposited upon the table which at the same time is moving past said station.

5. Installation as set forth in claim 4, comprising first and second intermediate vessels, first and second main resin tanks, a tank containing a polymerization accelerator, and a tank containing a polymerization catalyst, said stirring vessel being disposed beneath said intermediate vessels, said first vessel being disposed beneath said first main resin tank and said tank containing a polymerization accelerator, and said second vessel being disposed below said second main resin tank and said tank containing a polymerization catalyst, the volumetric capacity of each tank being a function of the mixture proportion.

6. Installation as set forth in claim 4 comprising spring means, at least one presser roll including a horizontal shaft and engaged in a vertical downward direction by said spring means, stop means being associated therewith for limiting the downward stroke of said roll when no table is passing thereunder, in order to obtain a regular resin layer downstream of the station where the resin mixture and the textile reinforcement are deposited upon the table.

7. Installation as set forth in claim 1, wherein the station whereat the isothermal panels are laid comprises a ramp above said tables and inclined downwardly in the direction of travel of said tables and having sides proximate and opposite said return track, said ramp including a plurality of horizontal parallel rolls mounted for free rotation, and further horizontal rolls disposed at right angles to and positioned at the ends of said parallel rolls and along the side of the ramp opposite to the return track to facilitate positioning said isothermal panels.

8. Installation as set forth in claim 1, wherein the station for stripping the panels finished on at least one face comprises an inclined ramp directed upwards and in the upstream to downstream direction, above the station for transfering the tables from said outward track to said return track, said ramp consisting of a series of parallel horizontal rolls.

References Cited

UNITED STATES PATENTS

| | | | |
|---|---|---|---|
| 3,671,355 | 6/1972 | Paymal | 156—555 X |
| 3,627,286 | 12/1971 | Palmer, Jr. | 432—241 |
| 2,709,864 | 6/1955 | Gulbrandsen | 156—299 X |
| 1,803,780 | 5/1931 | Upson | 156—555 X |
| 1,054,040 | 2/1913 | Scott | 432—241 X |
| 292,690 | 1/1884 | Sebillot | 432—121 |

CHARLES E. VAN HORN, Primary Examiner

M. G. WITYSHN, Assistant Examiner

U.S. Cl. X.R.

156—499, 557, 563, 584; 432—241.